United States Patent

[11] 3,576,052

| [72] | Inventor | Fritz Noack |
| | | Ottobeuren, Germany |
| [21] | Appl. No. | 772,917 |
| [22] | Filed | Nov. 4, 1968 |
| [45] | Patented | Apr. 27, 1971 |
| [73] | Assignee | Carding Specialists Canada Ltd. |
| | | Toronto, Ontario, Canada |

[54] APPARATUS FOR DETACHING BATCHES OR LAYERS OF COTTON FROM A BALE OR THE LIKE
8 Claims, 7 Drawing Figs.

| [52] | U.S. Cl. | 19/81 |
| [51] | Int. Cl. | D01g 7/06 |
| [50] | Field of Search | 19/86, 81, 145.5; 241/101.5; 146/70.1 |

[56] References Cited
UNITED STATES PATENTS
2,451,504  10/1948  Mayo .......................... 19/81X

*Primary Examiner*—Dorsey Newton
*Attorney*—Holman & Stern

ABSTRACT: Apparatus for detaching batches or layers of cotton or similar fibrous material from a bale or stack of such material, wherein a plurality of tines are caused to penetrate into the bale and are then moved away from the bale to detach a part of the same. Air under pressure is issued as jets from the free ends of the tines prior to penetration of the tines into the fibrous material.

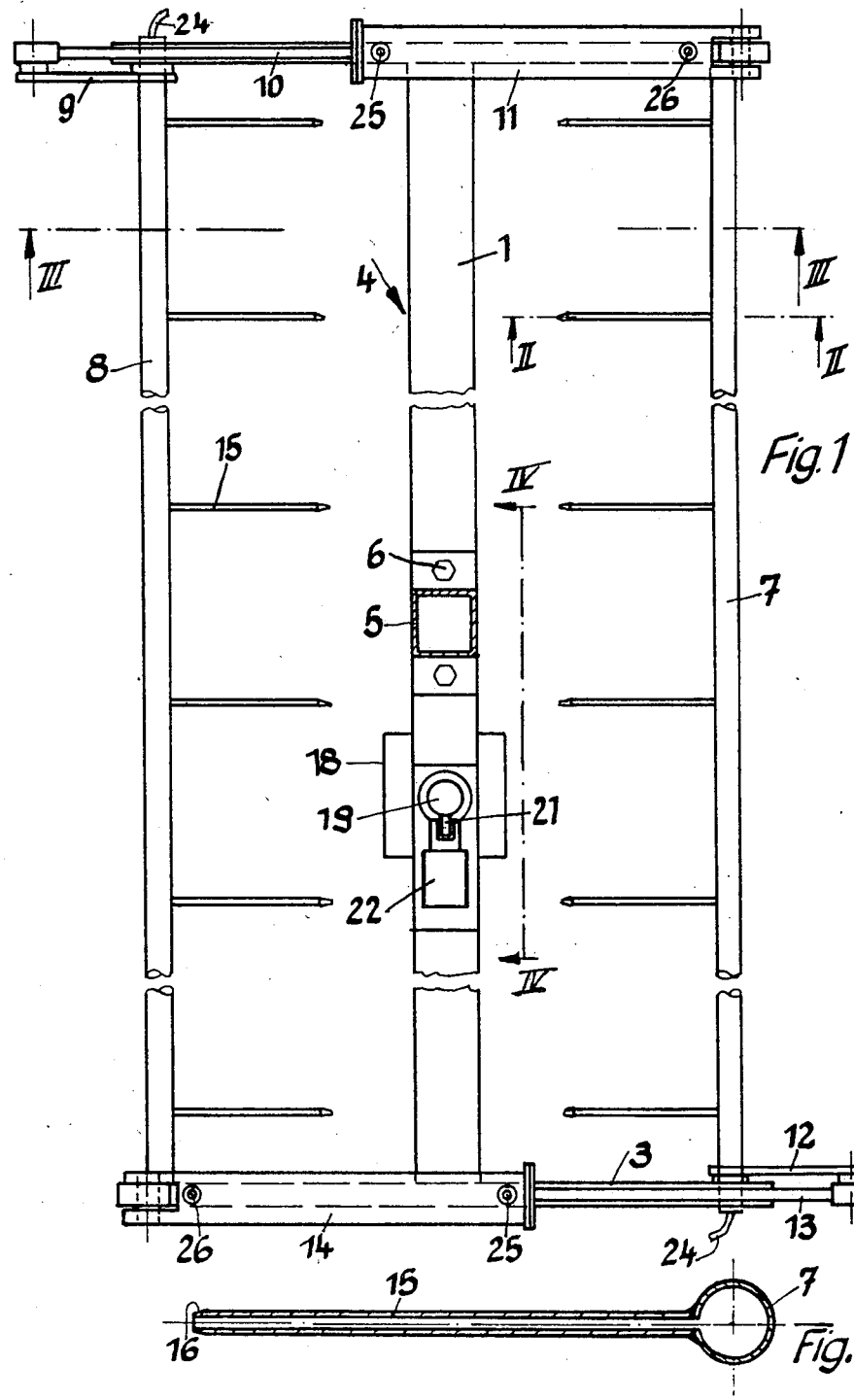

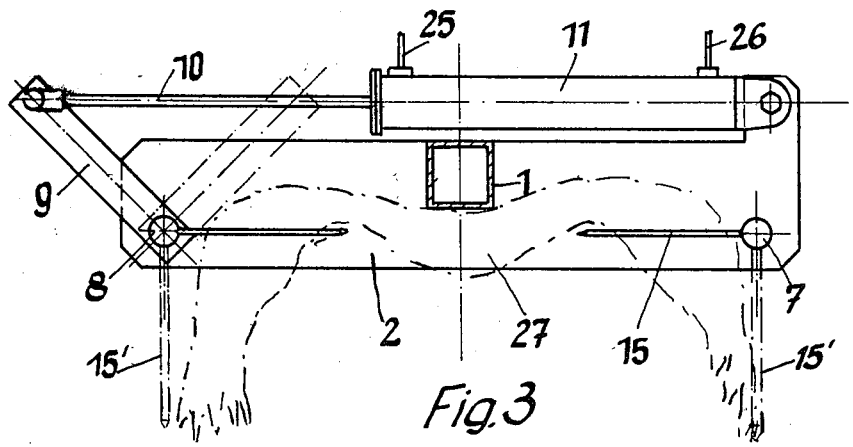
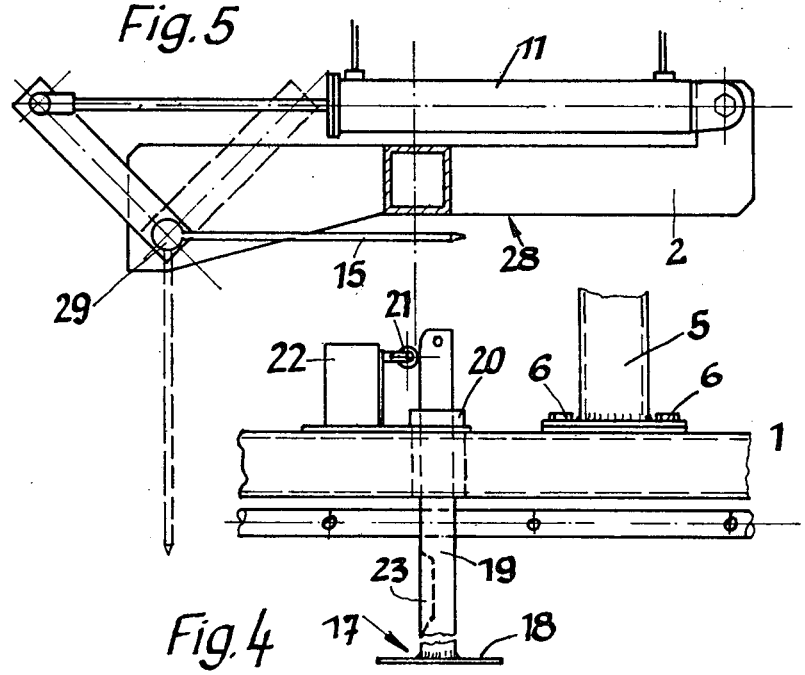

APPARATUS FOR DETACHING BATCHES OR LAYERS OF COTTON FROM A BALE OR THE LIKE

The present invention relates to an apparatus for detaching a batch of cotton, or other fiber material with similar qualities, from a stack, a bale or the like, for delivery to a cotton working machine.

Cotton for working in the textile industry is supplied in bales of large dimensions weighing in the region of 440—550 lbs. Two different types of cotton bales are generally known. In the layer-stacking of cotton the cotton is placed in single layers on top of each other, while in the so-called "roller-ginned" cotton no single layers are stacked on top of each other, but the bale contains small balls of cotton which, however, assume a layerlike configuration when the bale is compressed.

For working the cotton the bales are delivered first to a cotton opening and blending machine, whereby it is, however, desirable for different reasons to blend uniformly with each other the content of a larger number of bales of possibly different origin. The present invention is concerned with an apparatus by means of which it is possible to deliver the cotton from a bale in smaller amounts to the cotton opening and blending machine.

The use of mechanical devices for removing batches of cotton from the bale presents considerable difficulties. When attempting to penetrate into the cotton bale with a grab or a similar device having teeth or tines resistance to the penetration of the teeth or tines into the cotton is unexpectedly high. Even when using needle-shaped teeth or tines, the cotton is often merely compressed without the teeth or tines penetrating into the material.

Up to now it was generally necessary to remove the single layers or balls of cotton from the bales by hand and to deliver them to the subsequent machinery. The use of milling machine type devices for disintegrating the bales is possible, but this results in the creation of a considerable amount of dust, so that their use, apart from other reasons, is likewise not satisfactory.

It is an object of the present invention to provide an apparatus by which it is possible to remove batches of cotton from a bale or the like without the fiber material being damaged and without any appreciable formation of dust. A further object of the invention is the provision of means, by which it is possible to take up in a simple manner batches of fiber material, which are nearly always of the same size. It is also possible, with the apparatus according to the invention, to deliver the fiber material to the subsequent working machines in a manner such that the layer form of the single layers of the bale is, to a considerable extent, maintained.

With these objects in view the apparatus according to the invention comprises means having a plurality of tines, means for causing said tines to penetrate into said bale or stack and means for moving said tines away from said bale or stack, whilst penetrating into the bale or stack, to cause said tines to detach a batch or layer of material from said bale or stack, wherein said tines are hollow and means are provided for passing air under pressure through said tines and to issue as air jets at the pointed or free ends of said tines.

It has been found that discharging jets of compressed air at the points of the teeth or tines the above-mentioned difficulties in causing the teeth or tines to penetrate into the fiber material are eliminated in a surprising manner. Particularly if the jet of air issue from the points of the teeth or tines exclusively in the penetration direction, the penetration of the teeth or tines into the fiber material is no longer considerably impeded. The effect of the compressed air jets is to blow free a hole or channel in the fiber material, into which hole or channel the teeth or tines can easily penetrate. In other words the compressed air loosens the material in front of the point of the teeth or tines and pushes the fibers aside to permit easy penetration of the teeth or tines into the bale.

It has furthermore been established that in carrying out the invention it is unimportant whether the teeth or tines penetrate parallel or at a right-angle to the layer in the fiber material. The single layer or balls can thus be removed alternately either from the upper side of the bale or by means of teeth or tines which are pushed in from the side of the bale.

If the cotton is removed from the upper side of the bale, it can always be ensured that only one layer or a predetermined quantity of cotton is lifted off by controlling the depth of penetration of the teeth or tines.

Furthermore it has been found surprisingly that in spite of the use of compressed air no appreciable formation of dust occurs. The cotton acts as a filter keeping back dust particles.

In carrying out the invention it is important that the jets of compressed air are caused to issue from the points of the teeth or tines before the points of the teeth or tines penetrate into the material. In this manner the points of the teeth or tines are prevented from compressing the fiber material and thereby creating a resistance to the penetration of the teeth or tines into the fiber material.

In order that the invention may be more clearly understood various embodiments thereof will now be described, by way of example, with reference to the accompanying drawings, in which:

FIG. 1 is a plan view of an apparatus according to the invention;

FIG. 2 is a longitudinal sectional view, on an enlarged scale, of one of the teeth of the apparatus taken along the II–II of FIG. 1;

FIG. 3 is a section on the line III–III of FIG. 1;

FIG. 4 is an elevational view of a detail seen in the direction of the arrows IV–IV in FIG. 1;

FIG. 5 is a sectional view similar to FIG. 3 of a modified embodiment according to the invention;

Figure 6:
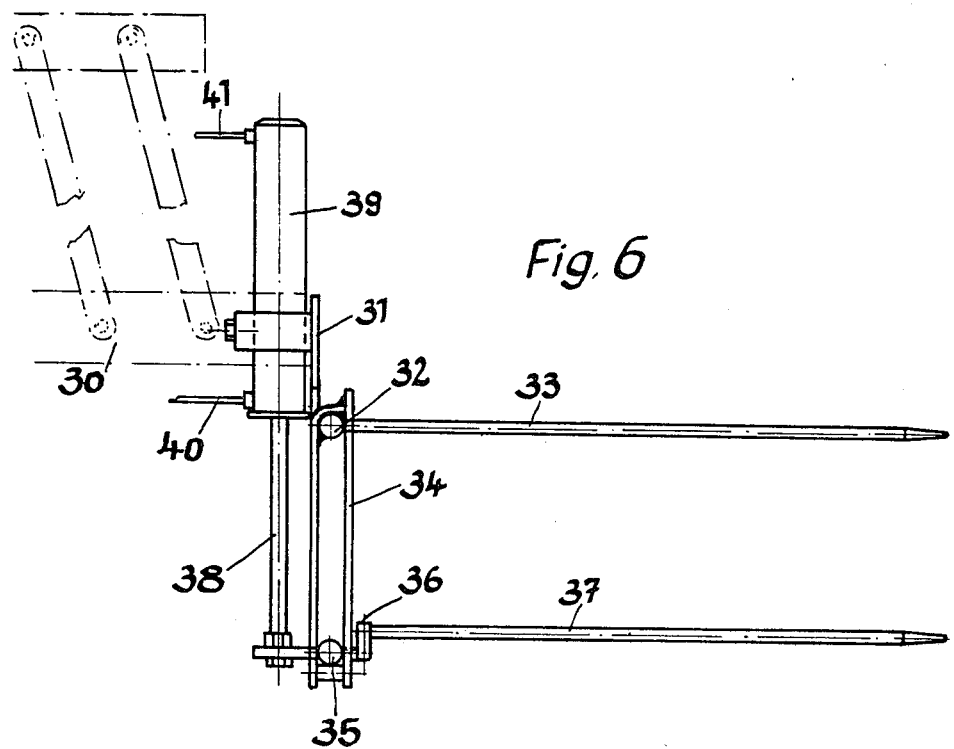
FIG. 6 is a side view of another embodiment of apparatus according to the invention.

Referring to FIGS. 1 to 4 of these drawings the apparatus according to the invention comprises a frame, indicated generally at 4, which includes a central horizontal hollow beam 1 of rectangular cross section and having attached to each of its ends a plate 2, 3 respectively in which are rotatably mounted tubular carrier members 7 and 8 each carrying a plurality of tines 15 with the tines of one carrier pointing towards the tines of the other carrier. The ends of the hollow beam 1 are attached at substantially the center of the plates 2 and 3 and the tubular carrier members 7 and 8 are rotatably mounted on the outer ends of said plates so as to be positioned one on opposite sides of said beam 1 and substantially parallel thereto.

Attached intermediate the ends of said horizontal beam 1 is the vertical column 5 of a lifting and lowering device (not shown) which serves to lower the frame 1 with the tine carriers 7 and 8 onto a bale of cotton and then raise said frame to remove some cotton, as hereinafter described, from the bale and transport it to a cotton working machine.

Pivotally mounted on the plate 2 at one end of the beam 1 is a pneumatic double-acting ram 11, the piston rod of which is pivotally connected to one end of a link 9 the opposite end of which is rigidly attached to the rotatable tubular carrier member 8. A similar pneumatic ram 14 is mounted in a similar manner to the plate 3 at the opposite end of the beam 1, the piston rod 13 of this ram being pivotally connected to one end of a link 12 whose other end is rigidly connected with the rotatable tubular carrier member 7. The cylinder of each of the rams 11, 14 is connected through pipe lines 25 and 26 with a suitable source of compressed air.

The tubular carrier members 7 and 8 each have at equally spaced intervals along their lengths a plurality of hollow parallel tines 15 which extend at right angles to said tubular carrier members and open into said tubular carrier members as shown in FIG. 2, thus the carrier members form conduits for supplying compressed air to the tines. The outer free end of each of said hollow tines is in the form of a pointed nozzle 16 and each of the tubular carrier members is connected through a pipe line 24 to a suitable source of compressed air. Thus in operation a jet of air is discharged from the pointed nozzle end of each of said hollow tines.

Mounted on the horizontal beam 1 is a feeler or sensing device 17 (FIG. 4) comprising a foot plate 18 mounted on the lower end of a vertical rod 19 slidable in a bushing 20 in said beam 1 and cooperating with a feeler 21 of a switch device 22 as hereinafter described.

The apparatus according to FIGS. 1 to 4 operates as follows:

Starting with the tines 15 in the position shown in full lines in FIGS. 1 and 3 the cylinders of the rams 11 and 14 are connected through the pipe lines 25 with a suitable source of compressed air. This causes the rams to contract to rotate the carrier members 7 and 8, through piston rods 10 and 13 and links 9 and 12 respectively, to move the tines 15 from the horizontal position into the vertical position 15' shown in chain dotted lines in FIG. 3. The frame 4, with the carrier members 7, 8 and tines 15, is then positioned above a bale of cotton and is lowered by the lifting and lowering device (not shown) by the vertical column 5 until the foot plate 18 of the feeler device comes into contact with the top of the bale located below it. Continued lowering of the frame 4 causes the rod 19 of the feeler device to slide upward in its bushing 20 until it comes into contact with the feeler 21, as shown in FIG. 4, and this operates the switch means 22 which in turn operates valve means (not shown) to connect the pipe line 24 of each of the carrier members 7 and 8 to a source of compressed air, thus causing air under pressure to enter the tubular carrier members 7 and 8 and discharge through the pointed nozzle ends of the tines 15. Continued downward movement of the frame 4 causes the tines, with air jets issuing therefrom, to penetrate into the bale of cotton. This movement continues until the feeler 21 of the switch means 22 enters a recess 23 in the lower part of the rod 19 whereupon the switch 23 operates to cut off the supply of compressed air to the hollow tines 15 and connect the cylinders of the rams 11 and 14 with a source of compressed air through pipe line 26 whereby said ram expands to cause the carrier members 7 and 8 to rotate to move the tines back into the horizontal position shown in full lines in FIG. 3 and carry with them a layer or batch 27 of cotton removed from the top of the bale. The frame 4 is then raised by the lifting and lowering device operatively associated with the vertical column 5 and moved into a position where the layer or batch 27 of cotton is to be deposited—for example onto a conveyor leading to a cotton opening and blending machine. The cylinders of the rams 11 and 14 are then again connected through pipe lines 25 to a source of compressed air whereby the rams operate as above described to move the tines 15 into the position shown at 15' in chain dotted lines in FIG. 3 to allow the layer or batch 27 of cotton to drop onto the conveyor or other location where it is to be deposited.

The above form of the apparatus according to the invention is preferred for use with cotton bales of "roller-ginned" cotton but with bales of layer stacked cotton a similar apparatus having only one tine carrier member with a single row of tines can be used. Such an embodiment is illustrated in FIG. 5 and comprises a single tine carrier 29 mounted on the frame 28 with a single pneumatic ram 11 mounted on the end plate 2 of the frame. The device is operated in the same manner as that according to FIGS. 1 to 4.

Figure 7:
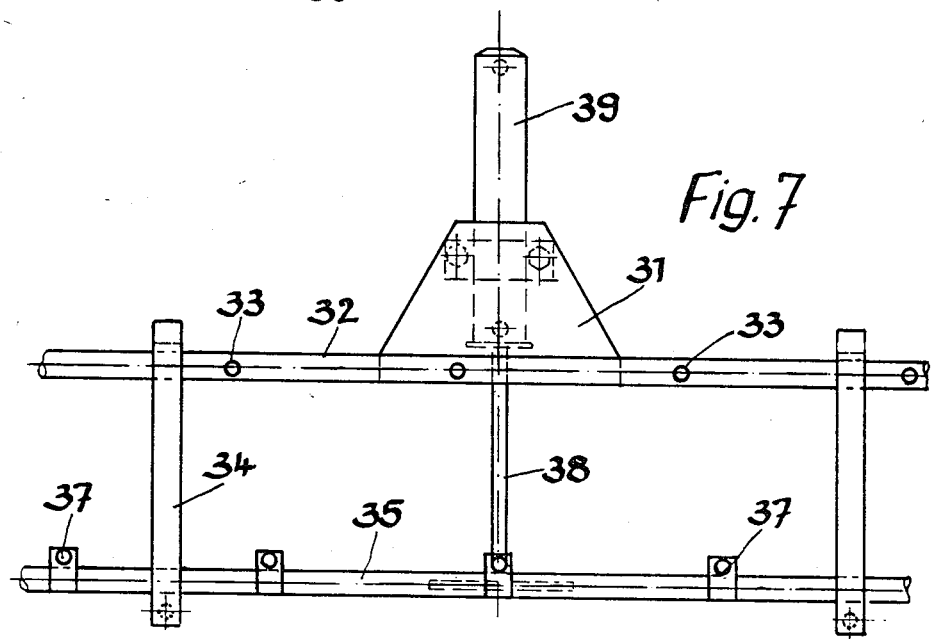
FIG. 7 is a front elevational view of the embodiment according to FIG. 6.

In the embodiment of the invention shown in FIGS. 6 and 7 a pair of tine carriers 32, 35 are supported by a frame plate 31 which is itself mounted on a lifting and lowering device 30 which may be of any suitable form. The tine carrier 32 is mounted directly on the frame plate 31 and also carries guide members 34 in which the tine carrier 35 is slidable towards and away from the tine carrier 32 by means of a pneumatic ram 39, the tine carrier 35 being connected directly to the free end of the piston-rod 38 of said ram. As in the previously described embodiments the tine carriers 32, 35 carry a plurality of spaced hollow tines 33, 37 and form conduits for supplying air under pressure to said hollow tines, said tine carriers being connected with a source of compressed air in any suitable manner.

As indicated in FIG. 7 the tines 33 of tine carrier 32 are offset relative to the tines 37 of tine carrier 35 and the tines of carrier 35 are connected with said carrier by angle portions 36.

In operation, starting from the positions shown in FIG. 6, the cylinder of ram 39 is connected with a source of compressed air through pipe line 40 thus causing the ram to contract and move the tine carrier 35 and its tubes 37 towards the tine carrier 32 and its tines 33 to bring the tines 37 and 33 into a common horizontal plane, this being possible by virtue of the angle portion 36 of tines 37 and the offset relationship of tines 33 and 37. When in this position the tubular tine carriers are connected with a source of compressed air, so that jets of air discharge from the pointed nozzle ends of the tines, and the tines are lowered by the lifting and lowering device 30—towards a bale of cotton and the tines caused to penetrate laterally into the bale. When the tines have penetrated to the required depth into the bale of cotton, the cylinder of the ram 39 is connected with a source of compressed air through pipe line 41 causing the tine carriers 32 and 35 to move apart to again assume the position shown in FIG. 6 and thus a layer or batch of cotton is detached from the bale; simultaneously the tine carriers are lifted, by the lifting and lowering device 30, to remove the detached layer or batch of cotton from the bale, said layer of cotton then being deposited at the desired location, for example on a conveyor leading to a cotton working or blending machine.

I claim:

1. An apparatus for detaching part of a quantity of cotton, or similar fibrous material from the remainder of said quantity of fibrous material, comprising tine carrier means, a plurality of tines supported on said carrier means, actuating means operatively associated with said carrier means for causing said carrier means to move said tines first in a direction to penetrate into said quantity of fibrous material and then in a direction away from said quantity of fibrous material, while penetrating into said quantity of fibrous material, to cause said tines to detach a part of said quantity of fibrous material from the remainder of said quantity of fibrous material, said tines being hollow and having free ends for penetrating said quantity of fibrous material, air supply means operatively associated with said tines for passing air under pressure through said tines to issue as air jets at said free ends of said tines, and control means operatively associated with said air supply means to initiate supply of air to said tines prior to penetration of said quantity of fibrous material by said tines.

2. An apparatus according to claim 1 wherein said plurality of said hollow tines are mounted in spaced parallel relationship on said carrier means.

3. An apparatus according to claim 2, wherein said carrier means is of tubular construction and forms a conduit for supplying air under pressure to said hollow tines.

4. An apparatus according to claim 1, further including frame means, said carrier means being rotatably mounted in said frame means, said actuating means including lowering and lifting means operatively associated with said frame means for lowering and lifting said frame means towards and away from said quantity of fibrous material, said actuating means further including a pneumatic ram having piston means operatively associated with said carrier means for effecting rotation of said carrier means to move said hollow tines into a position to penetrate the quantity of fibrous material when said frame means is lowered and in a direction to detach a part of said quantity of fibrous material from the remainder of said quantity of fibrous material when said frame means is lifted.

5. An apparatus according to claim 4, including two tine carriers rotatably mounted on said frame means in such a manner that when said tine carriers are moved in the direction to detach part of said quantity of fibrous material from the remainder of said quantity of fibrous material, said tines of said carriers point towards each other.

6. An apparatus according to claim 5, wherein said central means includes a feeler device carried by said frame means in such a manner as to be moved into and out of contact with said quantity of fibrous material during the lowering and lifting of said frame means, switch means operated by movement of said feeler device and controlling the supply of air under pressure to said hollow tines.

7. An apparatus according to claim 1, further including frame means, said actuating means including lowering and lifting means operatively associated with said frame means for lowering and lifting said frame means towards and away from said quantity of fibrous material, two parallel tine carriers mounted on said frame means with the tines of both tine carriers parallel to each other, said tine carriers being movable on said frame means relative to each other, while remaining parallel, and said actuating means further including means to move one of said tine carriers relative to the other to position the tines of both carriers in a common plane for penetrating said quantity of fibrous material and then to move said one tine carrier relative to the other to move said tines apart to detach a part of said quantity of fibrous material from the remainder of said quantity of fibrous material.

8. An apparatus according to claim 7, wherein the tines of one tine carrier are offset relative to the tines of the other tine carrier, guide members supporting said two tine carriers for movement relative to each other, and a pneumatic ram for moving said one tine carrier relative to the other in said guide members.